United States Patent [19]

Hwang

[11] Patent Number: 5,379,074

[45] Date of Patent: Jan. 3, 1995

[54] MULTILEVEL NONLINEAR FILTER FOR EDGE DETECTION AND NOISE SUPPRESSION

[75] Inventor: Humor Hwang, Suwon, Rep. of Korea

[73] Assignee: Samsung Electronics Co., Ltd., Kyungki-do, Rep. of Korea

[21] Appl. No.: 92,856

[22] Filed: Jul. 19, 1993

[30] Foreign Application Priority Data

Jul. 18, 1992 [KR] Rep. of Korea .................. 92-12806

[51] Int. Cl.$^6$ ............................................. H04N 5/213
[52] U.S. Cl. ................................... 348/606; 348/607; 348/625; 348/627
[58] Field of Search ............... 358/166, 167, 36, 37, 358/160, 448, 463, 447; H04N 5/14, 5/208, 5/213; 382/54, 22; 364/724.1, 724.19, 572, 574; 348/607, 625, 627, 628, 629, 631, 618, 606

[56] References Cited

U.S. PATENT DOCUMENTS

| | | | |
|---|---|---|---|
| 4,334,244 | 6/1982 | Chan et al. | 358/166 |
| 4,817,181 | 3/1989 | Kamiya | 380/54 |
| 4,823,190 | 4/1989 | Yamamoto | 358/166 |
| 4,896,364 | 1/1990 | Lohscheller | 382/22 |
| 5,255,078 | 10/1993 | Gibson | 358/36 |

*Primary Examiner*—James J. Groody
*Assistant Examiner*—Michael H. Lee
*Attorney, Agent, or Firm*—Sughrue, Mion, Zinn, Macpeak & Seas

[57] ABSTRACT

A multilevel nonlinear filter in a HD-MAC decoder, for performing intra-frame filtering corresponding to a post processing, and for performing a progressive scan conversion using edge information includes a delay unit for delaying an input image signal and providing both 1H- and 2H-delayed signals, an edge level estimation signal generating unit for generating first and second window mask data from the input image signal and the delayed signals, and performing a high-speed bubble sort for the generated first and second window mask data, thereby providing first and second estimation signals, an absolute difference signal generating unit for generating an absolute difference signal, an edge detection unit for comparing the output absolute difference signal with a predetermined threshold value, thereby producing edge detection information on a current pixel, and a noise suppression unit for median-filtering the first and second estimation signals and the information on the current pixel in case of edge detection information, and averaging-filtering the first and second estimation signals in case of non-edge detection information, thereby providing a filtered signal.

9 Claims, 4 Drawing Sheets

(CONTROL BITS)    (WINDOW MASK)

0  0  0

0  0  1

0  1  0

MULTILEVEL NONLINEAR FILTER FOR EDGE DETECTION AND NOISE SUPPRESSION

FIELD OF THE INVENTION

The present invention relates to a filter used in a high definition television (HDTV), and more particularly to a multilevel nonlinear filter in a HD-MAC (High Definition-Multiplexed Analog Components) decoder, for performing intra-frame filtering corresponding to a post processing, and for performing a progressive scan conversion using edge information. The present disclosure is based on the disclosure of Korean Patent Application No. 92-12806 filed Jul. 18, 1992, which disclosure is incorporated herein by reference.

BACKGROUND OF THE INVENTION

The HD-MAC is an European HDTV system which is compatible with a MAC system and can transmit an image through direct satellite broadcasting, and is a TV system having a specification such as an aspect ratio of 16:9, 1250 scanning lines, a field rate of 50 Hz and a 2:1 interlaced scanning. Accordingly, in the HD-MAC system, scanning lines of odd fields and even fields exist alternately.

A simple way for searching a motion vector in an image which exists at different positions in adjacent fields is to estimate a motion vector between frames (for example, odd and odd fields, even and even fields).

However, the accuracy in the vertical directional motion vector is low because the motion vector in the HD-MAC system is for field-interpolation. However, artifacts (for example, line crawling and interline flicker) by interlaced scanning can be considerably reduced by means of a scanning conversion into a progressive scan scheme.

Accordingly, it is needed for an image signal having 1250 scanning lines/50 Hz field rate/2:1 interlaced scanning to be converted into an image signal having 1250 scanning lines/50 Hz rate/1:1 progressive scanning. This is also needed for block-interpolation in the HD-MAC decoder.

In order to convert an image signal of interlaced scanning type into an image signal of progressive scanning type as described above, an image signal of 2:1 interlaced scanning having a 40 msec Nyquist space is obtained by filtering of a 40 msec filter within the HD-MAC, and then pixels to be interpolated with a median filter must be extracted.

FIG. 1 is a schematic circuit diagram of a known Finite Impulse Response(FIR)-median hybrid filter, which circuit is constructed with a sliding window 12 for sliding-outputting an input image signal $X_k(X_k = S_k + N_k)$ into a window (W=2P+1) of a predetermined size, first and second linear filters 14 and 16 for respectively outputting filtered signals L and R by respectively filtering the signal outputted from the sliding window 12 with the following equations (1) and (2), wherein $$L = \frac{1}{P} \sum_{j=k-p}^{k-1} \cdot X_j \quad (1)$$

$$R = \frac{1}{P} \sum_{j=k+1}^{k+p} \cdot X_j \quad (2)$$

a median filter 18 for receiving the signals L and R respectively outputted from the first and second linear filters 14 and 16, and also the signal outputted from the sliding window 12, and outputting a median signal $Y_k$. Here, S, N and P are signal level, noise level and number of pixels, respectively.

However, the conventional filter constituted as shown in FIG. 1 does not have an edge detection circuit and it has a mixed type structure composed of left and right linear filters 14 and 16 and a median filter 18 with respect to a center sample of an image signal. In such a circuit, as shown in FIG. 1, when noise of an input image signal is impulse, the L and R values respectively outputted from the linear filters 14 and 16 are values smeared out at the signal edge. That is, since the circuit as shown in FIG. 1 has no edge detection step, it cannot reduce the edge shifting effect due to the existence of impulse noise near the signal edge.

SUMMARY OF THE INVENTION

Accordingly, it is an object of the present invention to provide a multilevel nonlinear filter for performing edge detection and noise suppression.

It is another object of the present invention to provide a multilevel nonlinear filter for estimating signal level by applying window method to a median filter.

It is still another object of the present invention to provide a multilevel nonlinear filter for detecting an edge level using an absolute value of the difference of estimated signal edge levels.

It is a further object of the present invention to provide a multilevel nonlinear filter for suppressing noise using edge detection information.

To achieve the above objects, the present invention includes: a delay circuit for delaying an input image signal $X_k(X_k = S_k + N_k)$ by one horizontal line interval, and outputting 1H (H is one horizontal line)-delayed signal 1L and 2H-delayed signal 2L; an edge level estimation signal outputting circuit for generating first and second window mask data $X_{k-3}$, $X_{k-2}$, $X_{k-1}$, and $X_{k+1}$, $X_{k+2}$, $X_{k+3}$ masked into first, second and third patterns having 3×3 pixel size from the input image signal $X_k$ and the delayed signals 1L and 2L in response to an input of control bits, and bubble-sorting at high speed the generated first and second window mask data $X_{k-3}$, $X_{k-2}$, $X_{k-1}$, and $X_{k+1}$, $X_{k+2}$, $X_{k+3}$, thereby outputting first and second estimation signals L and R; an absolute difference signal outputting circuit for subtracting the outputted first estimation signal L from the outputted second estimation signal R, thereby outputting an absolute difference signal $|R-L|$; and an edge detection circuit for comparing the outputted absolute difference signal $|R-L|$ with a predetermined threshold value $\tau$, thereby outputting edge detection information on a current pixel; and noise suppression means for median-filtering the first and second estimation signals L and R and the information on the current pixel $X_k$ in response to the detected edge detection information in case of edge detection information, and averaging-filtering the first and second estimation signals L and R in response to the detected edge detection information in case of nonedge detection information, thereby outputting a filtered signal $Y_k$.

BRIEF DESCRIPTION OF THE DRAWINGS

The above objects and other advantages of the present invention will become more apparent by describing the preferred embodiment of the present invention with reference to the attached drawings, in which;

FIG, 1 is a block diagram showing a conventional FIR-median hybrid filter;

Figure 1:
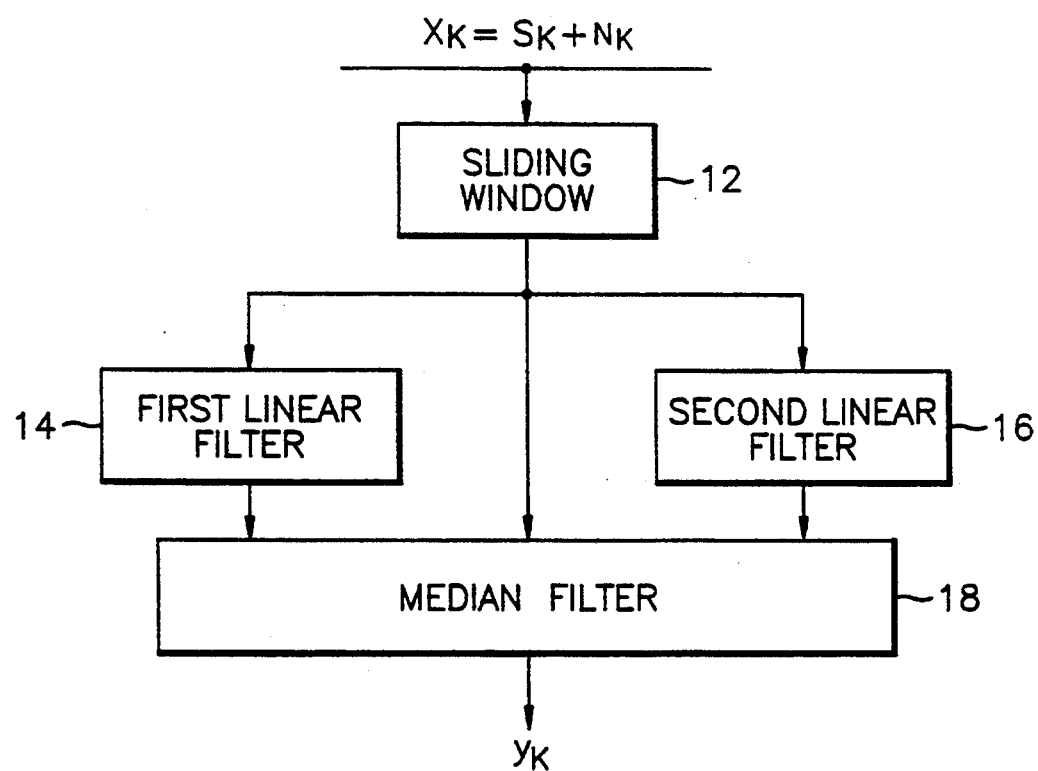

FIG, 2 is a block diagram of a multilevel nonlinear filter according to an embodiment of the present invention;

FIG, 3 is a masking pattern state diagram of a window mask controller according to the present invention; and FIG, 4 is a constitution diagram of an averaging-filter according to the present invention.

DETAILED DESCRIPTION OF THE PREFERRED EMBODIMENT

FIG, 2 is a block diagram of a multilevel nonlinear filter according to an embodiment of the present invention, The filter has a first horizontal line memory 20 and a second horizontal line memory 22 for delaying an input image signal $X_k(X_k=S_k+N_k)$ by one horizontal line interval, and for outputting 1H-delayed signal 1L and 2H-delayed signal 2L, wherein H designates one horizontal line, and a window mask controller 24 for outputting first and second window mask data $X_{k-3}$, $X_{k-2}$, $X_{k-1}$, and $X_{k+1}$, $X_{k+2}$, $X_{k+3}$ masked into first, second and third patterns having a 3×3 pixel size from the input image signal $X_k$ and the delayed signals 1L and 2L outputted from the first and second horizontal line memories 20 and 22 in response to an input of control bits. The filter also has first and second bubble sorters 26 and 28 for bubble-sorting at high speed the first and second window mask data $X_{k-3}$, $X_{k-2}$, $X_{k-1}$, and $X_{k+1}$, $X_{k+2}$, $X_{k+3}$ outputted from the window mask controller 24, respectively, thereby outputting first and second edge estimation signals L and R, respectively. A subtracter 30 is connected to subtract the first estimation signal L outputted from the first bubble sorter 26 from the second estimation signal R ouputted from the second bubble sorter 28, thereby outputting a subtracted signal R−L. The filter circuit also has a latch 32 for latching the subtracted signal R−L outputted from the subtracter 30, an absolute value portion 34 for converting an output of the latch 32 into an absolute difference signal |R−L|, thereby outputting the converted result, a latch 36 for latching the absolute difference signal |R−L| outputted from the absolute value portion 34, thereby outputting the latched result, and an edge detection comparator 38 for comparing the absolute difference signal |R−L| outputted from the latch 36 with a predetermined threshold value $\tau$, thereby outputting edge detection information on a current pixel $X_k$ as an edge detection signal if the absolute difference signal |R−L| is larger than the threshold value $\tau$, and outputting non-edge detection information if the absolute difference signal |R−L| is smaller than the threshold value $\tau$. A NMF (Nested Median Filter) 40 is coupled for median-filtering the first and second estimation signals L and R and the current pixel $X_k$ information in response to edge detection information outputted from the edge detection comparator 38, thereby outputting a filtered signal $Y_k$, and a MAF(Median Averaging Filter) 42 is coupled for averaging-filtering the first and second estimation signals L and R in response to no-nedge detection information outputted from the edge detection comparator 38, thereby outputting a filtered signal $Y_k$.

Figure 2:
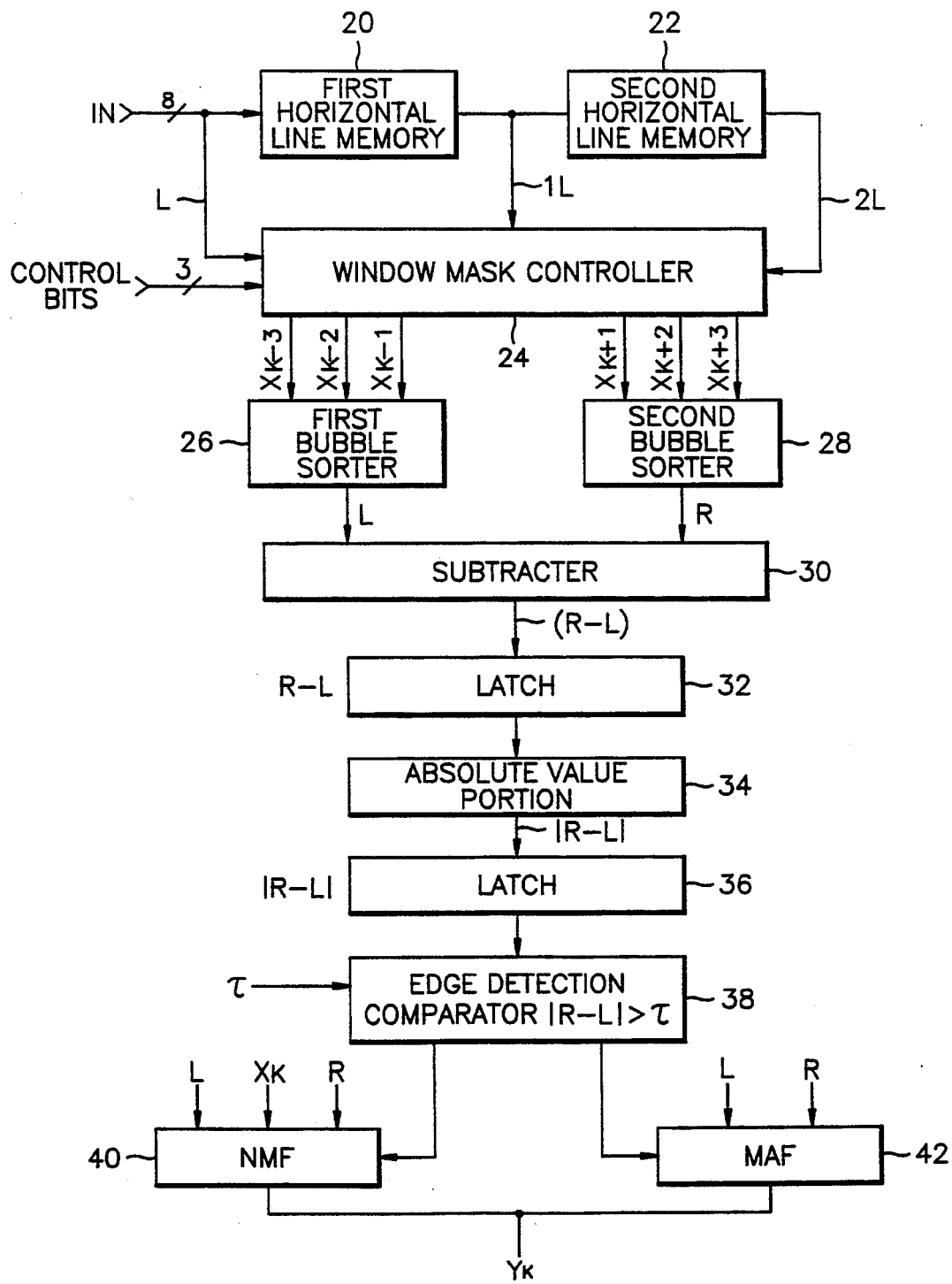
Figure 3:
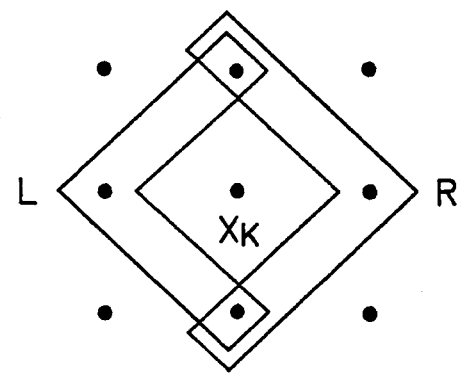
Figure 3:
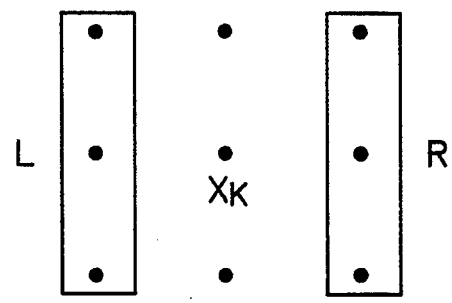
Figure 3:
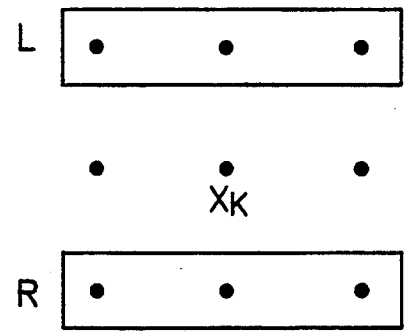

FIG. 3 is a masking pattern state diagram of a window mask controller according to the present invention, in which first and second window mask data $X_{k-3}$, $X_{k-2}$, $X_{k-1}$, i.e. , L, and $X_{k+1}$, $X_{k+2}$, $X_{k+3}$, i.e. , R, (FIG. 2) are masked into first, second and third patterns having a 3×3 pixel size from the input image signal $X_k$ and the delayed signals 1L and 2L outputted from the first and second horizontal line memories 20 and 22 by the input of control bits, i.e., 3 bits, are outputted.

For instance, if the control bits are "000", first and second window mask data $X_{k-3}$, $X_{k-2}$, $X_{k-1}$, i.e., L, and $X_{k+1}$, $X_{k+2}$, $X_{k+3}$, i.e. , R, masked into a first pattern are outputted, and If the control bits are, for instance, "001", first and second window mask data $X_{k-3}$, $X_{k-2}$, $X_{k-1}$, i.e., L, and $X_{k+1}$, $X_{k+2}$, $X_{k+3}$, i.e., R, masked into a second pattern are outputted. If the control bits are "010", the first and second window mask data $X_{k-3}$, $X_{k-2}$, $X_{k-1}$, i.e., L, and $X_{k+1}$, $X_{k+2}$, $X_{k+3}$, i.e., R, i.e., R, masked into third pattern are outputted as window data.

Figure 4:
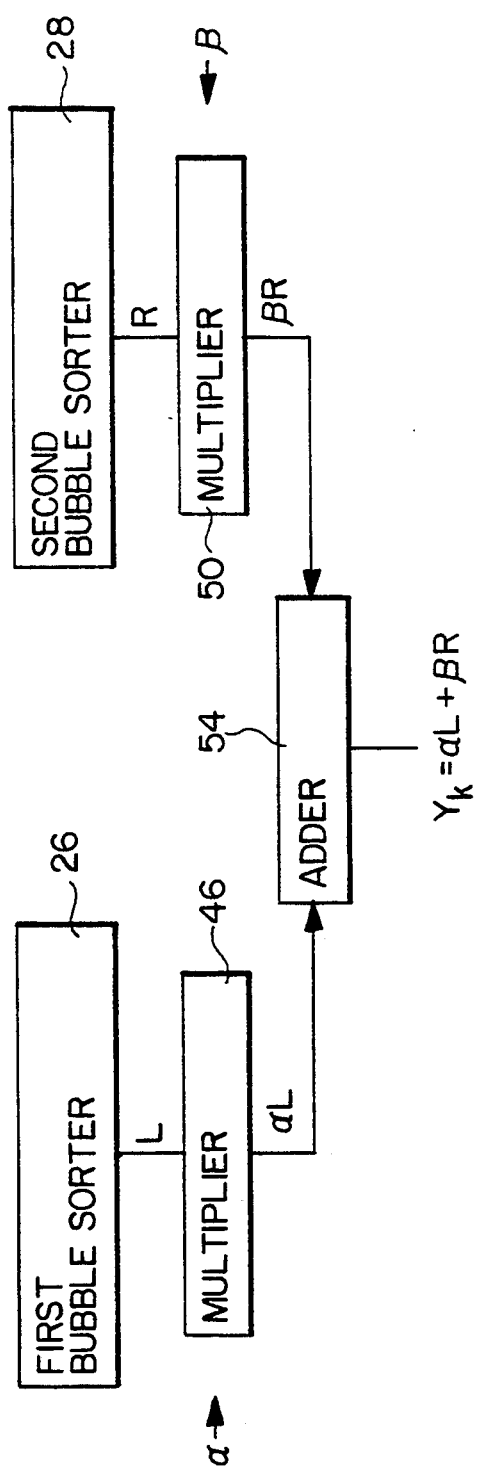

FIG. 4 is a constitution diagram of an averaging-filter according to the present invention, which comprises multipliers 46 and 50 for respectively multiplying the weighing coefficients $\alpha$ and $\beta$ by first and second estimation signals L and R respectively output from first and second bubble sorters 26 and 28 to thereby generate the outputs, and an adder 54 for adding outputs of the multipliers 46 and 50 to thereby output a filtered signal $Y_k$.

An embodiment according to the present invention will now be described in detail in connection with FIGS. 2–4.

If an image signal $X_k(X_k=S_k+N_k)$ is applied, it is inputted to first horizontal line memory 20 and window mask controller 24. At this time, the first horizontal line memory 20 is for the real time filtering process. That is, it is a DRAM for horizontal line memory for storing an active video portion having a resolution of 8 bits per pixel, and is controlled by a start-stop signal which is synchronized at the external horizontal line. Addresses of the first horizontal line memory 20 are self-incremented with a read-modify-write operation occurring in each address, so that the memory acts as a delay line. The operation of the second horizontal line memory 22 coupled to the output terminal of the first horizontal line memory 20 is the same as that of the first horizontal line memory 20.

Accordingly, if the image signal $X_k(X_k=S_k+N_k)$ is inputted, the first horizontal line memory 20 delays the image signal $X_k(X_k=S_k+N_k)$ by 1H, thereby outputting the delayed signal 1L to the window mask controller 24, and the second horizontal line memory 22 delays the 1H-delayed signal by 1H, thereby outputting the delayed signal 2L to the window mask controller 24.

By the above operation, the image signal $X_k$ and the delayed signals 1L and 2L respectively outputted from the first and second horizontal line memories 20 and 22 are inputted to the window mask controller 24. At this time, the window mask controller 24 masks the inputted 3-line image signal into first, second and third patterns of 3×3 pixel size by 3-bit control data inputted from the outside, and outputs the result. The relation of masking according to the input of control data is shown in FIG. 2. That is, the window mask controller 24 outputs the window mask discussed below by the control bits inputted from the outside.

If the control bits inputted from the outside are "000", the first and second window mask data $X_{k-3}$, $X_{k-2}$, $X_{k-1}$, i.e., L, and $X_{k+1}$, $X_{k+2}$, $X_{k+3}$, i.e., R, masked into the first pattern are outputted, and if the control bits are "001", the first and second window mask data $X_{k-3}$, $X_{k-2}$, $X_{k-1}$, i.e., L, and $X_{k+1}$, $X_{k+2}$, $X_{k+3}$, i.e., R, masked into the second pattern are outputted. If the control bits are "010", the first and second window mask data $X_{k-3}$, $X_{k-2}$, $X_{k-1}$, i.e., L, and $X_{k+1}$, $X_{k+2}$, $X_{k+3}$, i.e., R, masked into the third pattern are outputted to first and second bubble sorters 26 and 28, respectively.

The first and second bubble sorters 26 and 28 respectively receiving the first window mask data $X_{k-3}$, $X_{k-2}$, $X_{k-1}$ and the second window mask data $X_{k+1}$, $X_{k+2}$, $X_{k+3}$ outputted from the window mask controller 24 as shown in FIG. 3, apply the high-speed bubble sorting value to the inputted three pixels $X_{k-3}$, $X_{k-2}$, $X_{k-1}$, and $X_{k+1}$, $X_{k+2}$, $X_{k+3}$, respectively, thereby outputting the first and second estimation signals L and R, i.e., median, to the subtracter 30 respectively. At this time, the first and second bubble sorters 26 and 28 compare adjacent two pixels among the inputted pixels and stack pixels in their internal buffers in increasing order. 3-level comparison is performed for data. At this time, since each of the three levels has a pipeline parallel structure, the sorting speed is determined by one compare exchange level.

The first and second edge estimations L and R are the median filter outputs formed using the samples of the left and right side of the test sample $X_k$, respectively, i.e., $$L = med(X_{k-3}, X_{k-2}, X_{k-1})$$

$$R = med(X_{k+1}, X_{k+2}, X_{k+3})$$

where the term "med" represents median. This pair of median filters eliminate the impulse-type of noise while providing estimates of the signal levels at either side of the point $X_k$ being tested for an edge. The operations of the bubble sorters 26 and 28 include sorting as well as 3-level comparison for median filtering outputs L and R.

The subtracter 30 receiving the first and second estimation signals L and R performs subtraction of the two signals, thereby outputting a difference signal R−L to the latch 32. The latch 32 outputs the difference signal R−L to the absolute value portion 34 composed of a random logic circuit. The absolute value portion 34 converts the difference signal R−L outputted from the latch 32 into an absolute difference signal $|R-L|$ and outputs the converted signal to the latch 36. The latch 36 outputs the inputted absolute difference signal $|R-L|$ to the edge detection comparator 38 receiving a predetermined threshold value $\tau$.

Accordingly, the edge detection comparator 38 compares the absolute difference signal $|R-L|$ with a predetermined threshold value $\tau$ and outputs edge detection information on the current pixel $X_k$ as an edge detection signal to the NMF 40 when the absolute difference signal $|R|L|$ is larger than the threshold value $\tau$ and outputs the nonedge estimation information to the MAF 42 when the absolute difference signal $|R|L|$ is smaller than the threshold value $\tau$. That is, when the signal is an edge, the edge detection information $D_k$ is outputted as logic "1" to the NMF 40, and when the signal is non-edge, the edge detection information $D_k$ is outputted as logic "0" to the MAF 42. At this time, the threshold value $\tau$ inputted to the edge detection comparator 38 is estimated from priority information on the signal as a minimum signal edge height. Priority information means advance information of a given image signal to be processed. For example, image data taken from a picture of a person's face have a number of edge information, wherein the edge information of the minimum level for detecting a number of edge information is defined as priority information which can be set by one having ordinary knowledge in this field. Further, the threshold value $\tau$ can be estimated from priority information by testing using a Maximum Likelihood Estimator.

Accordingly, when the edge detection information $D_k$ outputted from the edge detection comparator 38 is logic "1", the NMF 40 is operated, and when the edge detection information $D_k$ is logic "0", the MAF 42 is operated.

When the edge detection information $D_k$ outputted from the edge detection comparator 38 is logic "1", the NMF 40 receiving the first and second estimation signals L and R and the current pixel $X_k$ information is operated, and filters the inputted information, so that a filtered signal $Y_k$ is outputting using by the following relationship:

$$Y_k = med(L, X_k, R) \qquad (3)$$

At this time, the NMF 40 operated as shown in the relation (3) maintains the detected edge point and suppresses impulse noise which can exist in the edge.

If the edge detection information $D_k$ outputted from the edge detection comparator 38 is a logic "0", then MAF 42 which is a 2-pixel averaging filter is operated and averaging-filters the first and second estimation signals L and R, thereby outputting a filtered signal $Y_k$. That is, the MAF 42 constructed as shown in FIG. 4 inputs the first and second estimation signals L and R output from the first and second bubble sorters 26 and 28 to its internal multipliers 46 and 50. The multipliers 46 and 50, respectively, multiply the weighing coefficients $\alpha$ and $\beta$ by the first and second estimator signals L and R, respectively, to thereby generate the signals $\alpha L$ and $\beta R$. Then in the adder 54, the outputs of the multipliers 46 and 50 are combined to form the filtered signal $Y_k$ given by the following equation:

$$Y_k = \alpha L + \beta R \qquad \ldots (4)$$

The MAF 42, operated as shown in equation (4) outputs the sum of weighted values of only the first and second estimation signals at the non-edge where impulse is free (i.e., no noise having impulse exists in the first and second estimation signals L and R).

When the signal $D_x$ outputted from the edge direction comparator 38 is zero (non-edged), the MAF 42 receiving the first and second estimations is operated, and filters the first and second estimation signals L and R absent impulse at the non-edge point, so that the filtered signal $Y_k$ is ouputted as shown in equation (4) above.

In the above equations, $\alpha$ and $\beta$ are weighting coefficients, and they should be selected as the optimum coefficient minimizing MSE (Mean Square Error). Consequently, the MAF 42 outputs the sum of weighted values of only the first and second estimation signals L and R at the non-edge point where impulse is free.

As described above, the present invention implements multilevel nonlinear filter performing median-filtering by adapting window method, so that it can perform edge detection and noise suppression and can reduce edge-shifting.

What is claimed is:

1. A multilevel nonlinear filter for edge detection and noise suppression comprising:

delay means for outputting a 1 horizontal line delayed signal 1H and a 2 horizontal line delayed signal 2H;

edge level estimation signal output means generating first and second window mask data masked into respective first, second and third patterns, each having a predetermined size, from said input image signal and said delayed signals 1H and 2H in response to input control bits, and performing high-speed bubble sorting of said first and second window mask data, thereby outputting first and second edge estimation signals;

absolute difference signal outputting means for performing subtraction of said outputted first and second edge estimation signals, thereby outputting an absolute difference signal;

edge detection means for comparing said outputted absolute difference signal with a predetermined threshold value, thereby outputting edge detection information on a current pixel; and noise suppression means for median-filtering said first and second estimation signals and said information on said current pixel in response to said detected edge detection information, and averaging-filtering said first and second estimation signals in response to non-edge detection information, thereby outputting a filtered signal.

2. The filter as claimed in claim 1, wherein said delay means comprises a first horizontal line memory for delaying said input image signal by one horizontal line and outputting said one horizontal line delayed signal 1H, and a second horizontal line memory for delaying said signal 1H by one horizontal line and outputting said two horizontal line delayed signal 2H.

3. The filter as claimed in claim 1, wherein said edge level estimation signal output means comprises:

a window mask controller outputting said first and second window mask data masked into first, second and third patterns each having a $3 \times 3$ pixel size from said image signal and said delayed signals 1H and 2H, respectively, outputted from said first and second horizontal line memories in response to said input control bits; and first and second bubble sorters for bubble-sorting at high speed said first and second window mask data outputted from said window mask controller, thereby outputting first and second edge estimation signals, respectively.

4. The filter as claimed in claim 1, wherein said absolute difference signal outputting means comprises:

a subtracter for performing subtraction of said first and second edge estimation signals outputted from said first and second bubble sorters, thereby outputting a subtracted signal;

a first latch for latching said subtracted signal outputted from said subtracter;

an absolute value portion for converting an output of said first latch into an absolute difference signal and outputting said absolute difference signal; and a second latch for latching and outputting said absolute difference signal outputted from said absolute value portion.

5. The filter as claimed in claim 4, wherein said edge detection means is a comparator for comparing said absolute difference signal outputted from said second latch with a predetermined threshold value, and outputting said information on said current pixel as an edge detection signal when said absolute difference signal is larger than said threshold value, and outputting non-edge detection information when said absolute difference signal is smaller than said threshold value.

6. The filter as claimed claim 3, wherein said noise suppression means comprises:

a nested median filter for median-filtering said first and second edge estimation signals and said information on said current pixel in response to said edge detection information on said current pixel outputted from said edge detection means and for outputting a filtered signal; and a median averaging filter for averaging-filtering said first and second estimation signals in response to said non-edge detection information outputted from said edge detection means and outputting a filtered signal.

7. The filter as claimed in claim 6, wherein said median averaging filter comprises:

a programmable filter coefficient calculator;

a buffer for temporarily storing said programmable filter coefficient;

a shift register shift-outputting input data;

a buffer for buffering an output of said shift register; and a multiplier for performing multiplication of a filtered coefficient and shifted data outputted from said two buffers and outputting a multiplication result.

8. The filter as claimed claim 4, wherein said noise suppression means comprises:

a nested median filter for median-filtering said first and second estimation signals and said information on said current pixel in response to said edge detection information corresponding to said current pixel outputted from said edge detection means and for outputting a filtered signal; and a median averaging filter for averaging-filtering said first and second estimation signals in response to said non-edge detection information outputted from said edge detection means and outputting a filtered signal.

9. The filter as claimed claim 5, wherein said noise suppression means comprises:

a nested median filter for median-filtering said first and second estimation signals and said information on said current pixel in response to said edge detection information for said current pixel outputted from said edge detection means and for outputting a filtered signal; and a median averaging filter for averaging-filtering said first and second estimation signals in response to said non-edge detection information outputted from said edge detection means and outputting a filtered signal.

* * * * *